US007338126B2

United States Patent
Ropp

(10) Patent No.: US 7,338,126 B2
(45) Date of Patent: Mar. 4, 2008

(54) VEHICLE SEAT SUSPENSION WITH OMNI DIRECTIONAL ISOLATOR

(75) Inventor: Dale Ropp, Buda, IL (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 11/434,548

(22) Filed: May 15, 2006

(65) Prior Publication Data

US 2006/0255639 A1     Nov. 16, 2006

Related U.S. Application Data

(63) Continuation-in-part of application No. 10/873,535, filed on Jun. 22, 2004, now Pat. No. 7,044,553.

(51) Int. Cl.
*B60N 2/02* (2006.01)
*B60N 2/10* (2006.01)
*B60N 2/16* (2006.01)

(52) U.S. Cl. .......................... 297/344.15; 297/344.13; 297/344.17; 297/313; 297/314; 297/325; 297/329

(58) Field of Classification Search ........... 297/344.15, 297/344.13, 344.17, 313, 314, 325, 329
See application file for complete search history.

(56) References Cited

U.S. PATENT DOCUMENTS

| | | | | |
|---|---|---|---|---|
| 348,633 | A * | 9/1886 | McFarland ............... | 297/313 X |
| 1,093,042 | A * | 4/1914 | Etherington ............. | 297/314 X |
| 1,281,921 | A * | 10/1918 | Etherington ............ | 297/314 X |
| 1,398,935 | A * | 11/1921 | Miller ..................... | 297/314 X |
| 1,429,979 | A * | 9/1922 | Spanenberg ............. | 297/314 X |
| 2,489,981 | A * | 11/1949 | Rose ....................... | 297/314 X |
| 2,607,397 | A * | 8/1952 | Schneider ............... | 297/325 X |
| 2,707,986 | A * | 5/1955 | Johnson ................... | 297/314 X |
| 2,799,323 | A * | 7/1957 | Berg ....................... | 297/314 X |
| 3,090,647 | A * | 5/1963 | Moore ............... | 297/344.13 X |
| 3,134,568 | A * | 5/1964 | Carson ........................ | 248/425 |
| 3,558,188 | A * | 1/1971 | Groh et al. ............ | 297/344.13 |
| 4,095,770 | A * | 6/1978 | Long ....................... | 297/314 X |

(Continued)

FOREIGN PATENT DOCUMENTS

JP     02024232 A * 1/1990 .................. 297/314

(Continued)

*Primary Examiner*—Rodney B. White
(74) *Attorney, Agent, or Firm*—Niro, Scavone, Haller & Niro

(57) ABSTRACT

The present invention is directed to a vehicle seat suspension apparatus that is mechanically simple, inexpensive, occupies little space, and operates effectively with force inputs from any horizontal direction. The invention comprises a base, an isolator, and a plurality of links connected to both the base and isolator so that the isolator is suspended from the base and can move or swing horizontally in all directions relative to the base. The isolator has an upper plate with two flanges that depend from the plate. The base is positioned directly below the upper plate and between the two flanges. The links are connected to the base and the flanges of the isolator by means of ball and socket connectors that permit the isolator to move in all horizontal directions relative to the base. A travel limit system is used to permit adjustment in the travel of the isolator relative to the base.

5 Claims, 6 Drawing Sheets

U.S. PATENT DOCUMENTS

| | | | |
|---|---|---|---|
| 4,183,493 A * | 1/1980 | Koutsky .................... 248/430 |
| 4,372,606 A * | 2/1983 | Faull ....................... 297/313 X |
| 4,408,744 A * | 10/1983 | Thompson ................. 248/636 |
| 4,455,009 A * | 6/1984 | Foster et al. ................ 248/561 |
| 4,461,444 A * | 7/1984 | Grassl et al. ....... 297/344.15 X |
| 4,477,050 A * | 10/1984 | Thompson et al. ......... 248/636 |
| 4,491,366 A * | 1/1985 | Silber ....................... 297/329 |
| 4,607,578 A * | 8/1986 | Inoue et al. ............ 248/421 X |
| 4,729,539 A * | 3/1988 | Nagata .............. 297/344.15 X |
| 4,856,763 A * | 8/1989 | Brodersen et al. ...... 248/564 X |
| 4,880,201 A * | 11/1989 | Hall et al. .......... 297/344.15 X |
| 4,915,447 A * | 4/1990 | Shovar .................. 297/284.11 |
| 4,934,647 A * | 6/1990 | Edwards ................. 248/421 X |
| 5,482,354 A * | 1/1996 | Gryp ..................... 297/344.22 |
| 5,570,929 A * | 11/1996 | Glockl ....................... 297/313 |
| 5,584,460 A * | 12/1996 | Ropp ................. 297/344.1 X |
| 5,590,930 A * | 1/1997 | Glockl ....................... 297/313 |
| 5,599,065 A * | 2/1997 | Gryp et al. ............ 297/344.22 |
| 5,676,424 A * | 10/1997 | Winkelhake ....... 297/344.13 X |
| 5,695,248 A * | 12/1997 | Bell ....................... 297/344.17 |
| 5,720,462 A * | 2/1998 | Brodersen .................. 248/425 |
| 5,795,022 A * | 8/1998 | Brown ..................... 297/314 |
| 5,871,257 A * | 2/1999 | Dundes, Sr. ................ 297/314 |
| 5,938,340 A * | 8/1999 | Brodersen .................... 384/40 |
| 6,068,280 A * | 5/2000 | Torres .................... 297/314 X |
| 6,340,207 B1 * | 1/2002 | Brightbill et al. ....... 297/314 X |
| 6,554,359 B2 * | 4/2003 | Kohl et al. ........... 297/344.15 |
| 6,595,586 B2 * | 7/2003 | Brightbill et al. ....... 297/314 X |
| 6,616,117 B2 * | 9/2003 | Gryp et al. ......... 297/344.15 X |
| 7,044,553 B2 * | 5/2006 | Ropp .................... 297/344.15 |
| 7,140,589 B2 * | 11/2006 | Woodard et al. .... 297/344.13 X |
| 2002/0135214 A1 * | 9/2002 | Ursel et al. ............. 297/325 X |
| 2003/0011229 A1 * | 1/2003 | Bell ....................... 297/344.17 |
| 2004/0090100 A1 * | 5/2004 | Igarashi ................. 297/344.15 |

FOREIGN PATENT DOCUMENTS

| | | | | |
|---|---|---|---|---|
| JP | 03220031 A * | 9/1991 | ................ 297/314 |
| JP | 05199930 A * | 8/1993 | ................ 297/314 |

* cited by examiner

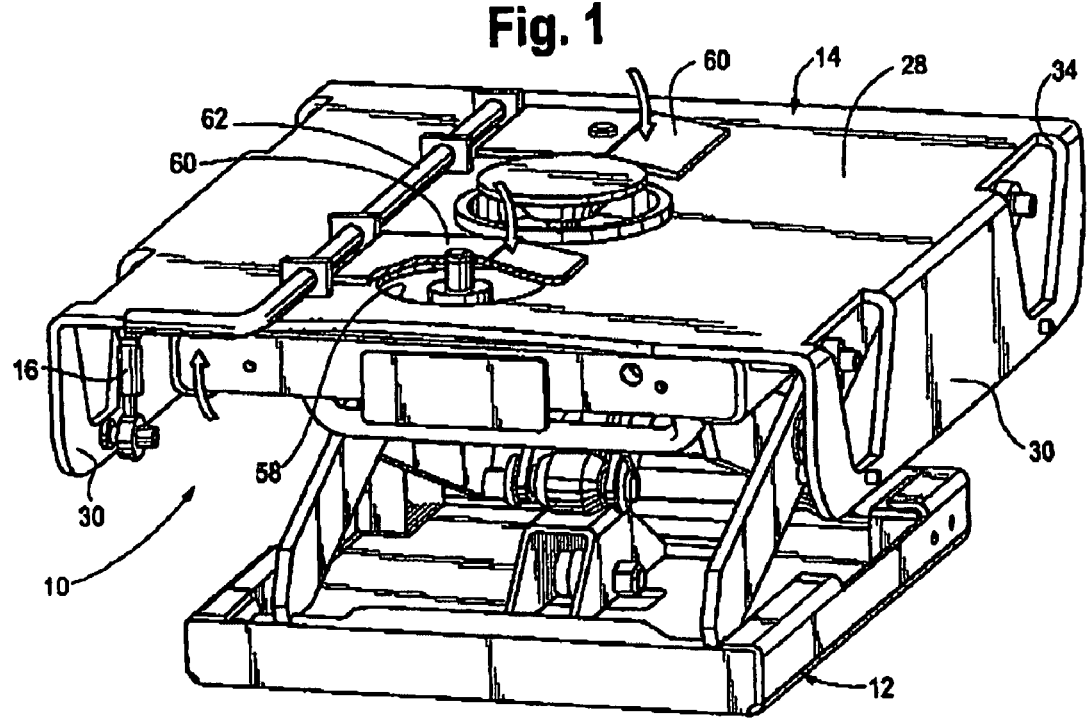
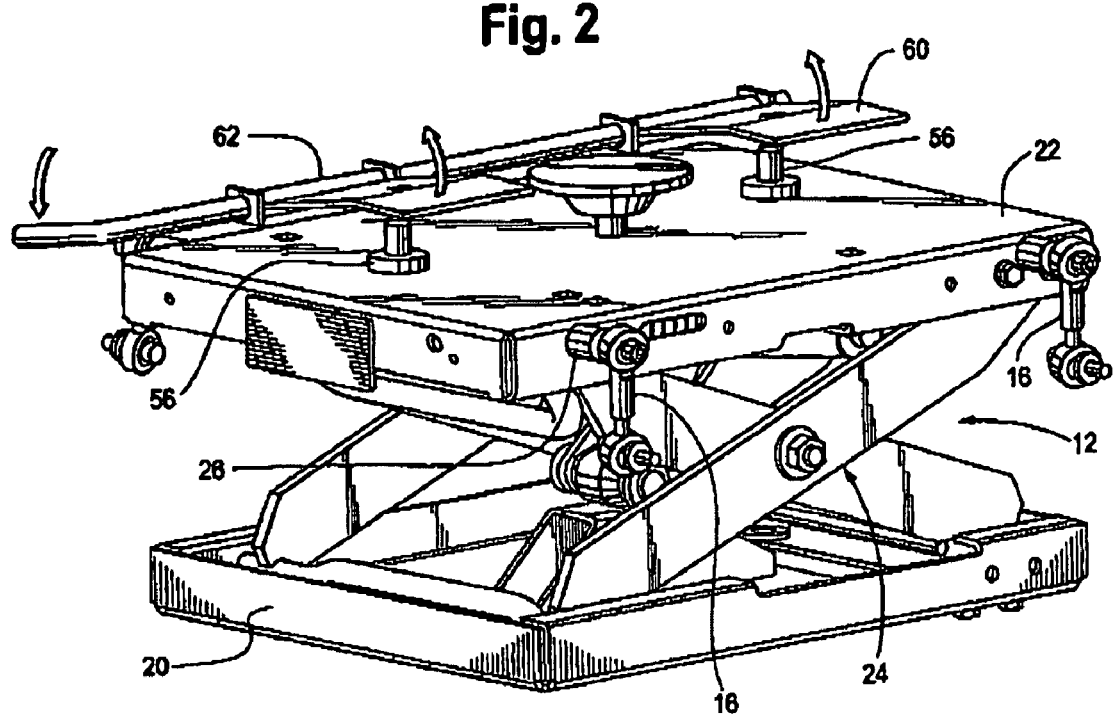

VEHICLE SEAT SUSPENSION WITH OMNI DIRECTIONAL ISOLATOR

RELATED APPLICATIONS

This application is a continuation-in-part of U.S. patent application Ser. No. 10/873,535 filed Jun. 22, 2004, now U.S. Pat. No. 7,044,553.

BACKGROUND OF THE INVENTION

The present invention relates generally to vehicle seat suspension. More particularly, the invention relates to a vehicle seat suspension which incorporates a new and unique isolation system for reducing the transmission of horizontally directed forces to the seat occupant.

For many years, it has been common practice to provide vehicle seats with some form of "isolation" system. So called "fore and aft" isolators have been employed to reduce the undesirable effects of forces inputted to the seat from the front or back. So too, "lateral" isolators have been used for the same purpose with respect to forces input from the sides of the vehicle. Oftentimes, both fore/aft and lateral isolators are used together. The combined systems, however, are less than satisfactory. First they are relatively complex mechanically and are therefore expensive both to manufacture and install. Second, with space constraints becoming increasingly severe, these combined systems tend to present too high a profile. Lastly, they tend to react along the fore and aft or lateral axes and therefore do not react as effectively to angular inputs. It would be desirable therefore to provide a truly omni directional isolator that is simple in construction, inexpensive to manufacture, effective in attenuating forces input from all directions, and occupies a relatively small space envelope.

SUMMARY OF THE INVENTION

The present invention is directed to a vehicle seat suspension apparatus that achieves the aforementioned goals. It is relatively small, mechanically simple, inexpensive, and operates effectively with force inputs from any horizontal direction. The invention comprises a base, an isolator, and a plurality of links connected to both the base and isolator so that the isolator is suspended from the base and can move or swing horizontally in all directions relative to the base.

In the illustrated preferred embodiment the isolator is constructed with an upper plate having two flanges that depend from the plate. The base is positioned directly below the upper plate and between the two flanges. The links are connected to the base and the flanges of the isolator by means of ball and socket connectors that permit the isolator to move in all horizontal directions relative to the base.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a perspective view of one preferred embodiment of the present invention;

FIG. 2 is another perspective view of the preferred embodiment illustrated in FIG. 1 with the isolator plate removed to show details of construction;

DETAILED DESCRIPTION OF THE PREFERRED EMBODIMENTS

Figure 3:
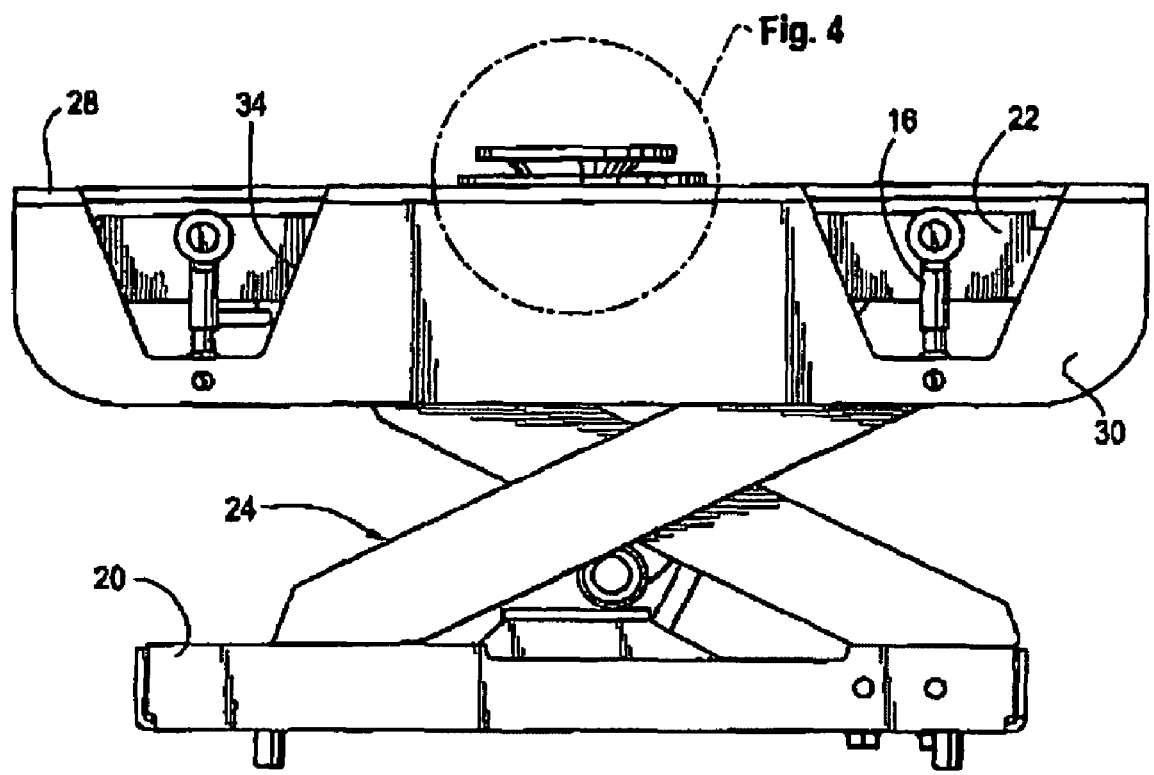
FIG. 3 is a side view of the same preferred embodiment shown in FIG. 1.
Figure 4:
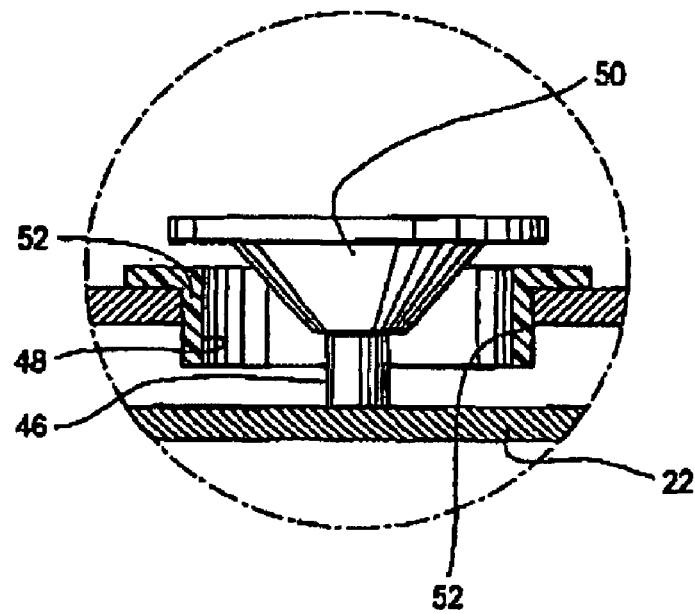
FIG. 4 is an enlarged cross-section view of certain components circled in FIG. 3.
Figure 5:
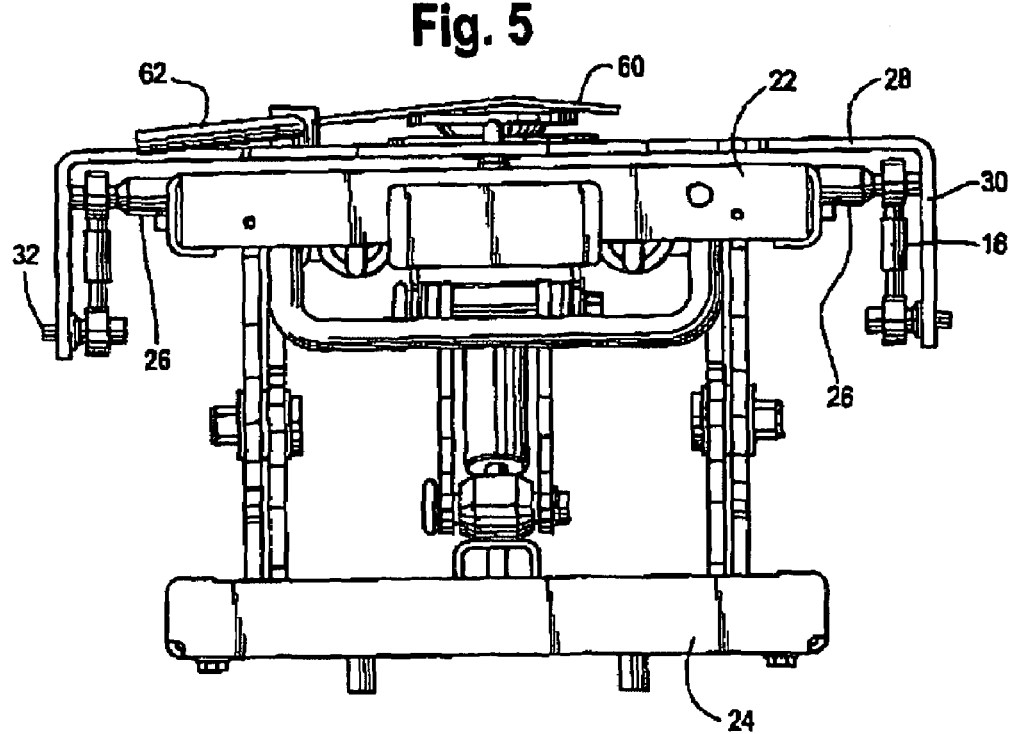
FIGS. 5 and 6 are end views of the embodiment of FIG. 1, showing respectively centered and displaced positions of the isolator.
Figure 6:
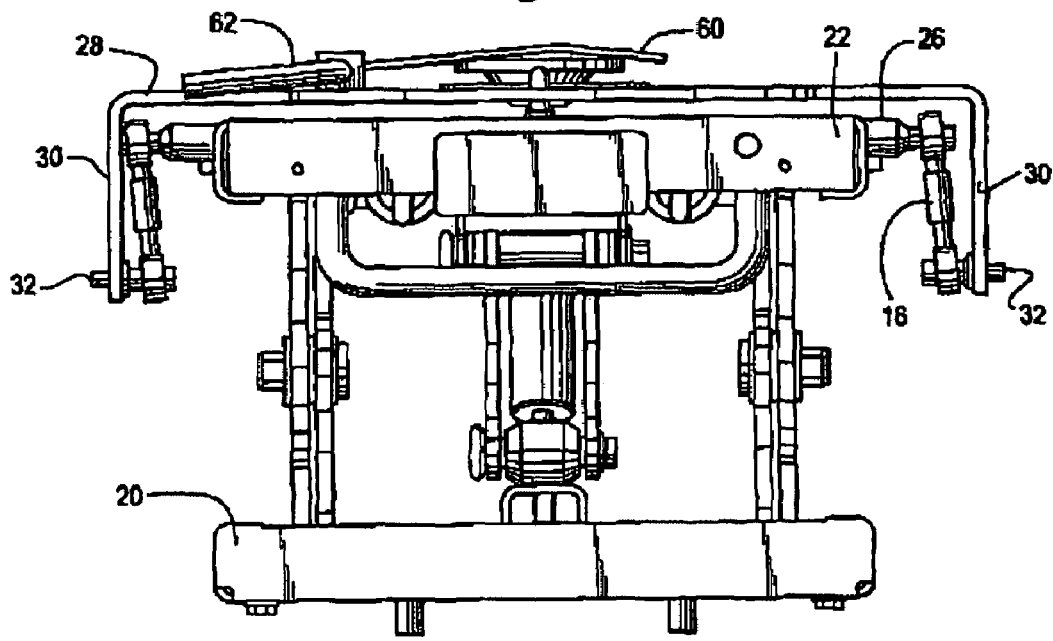
Figure 7:
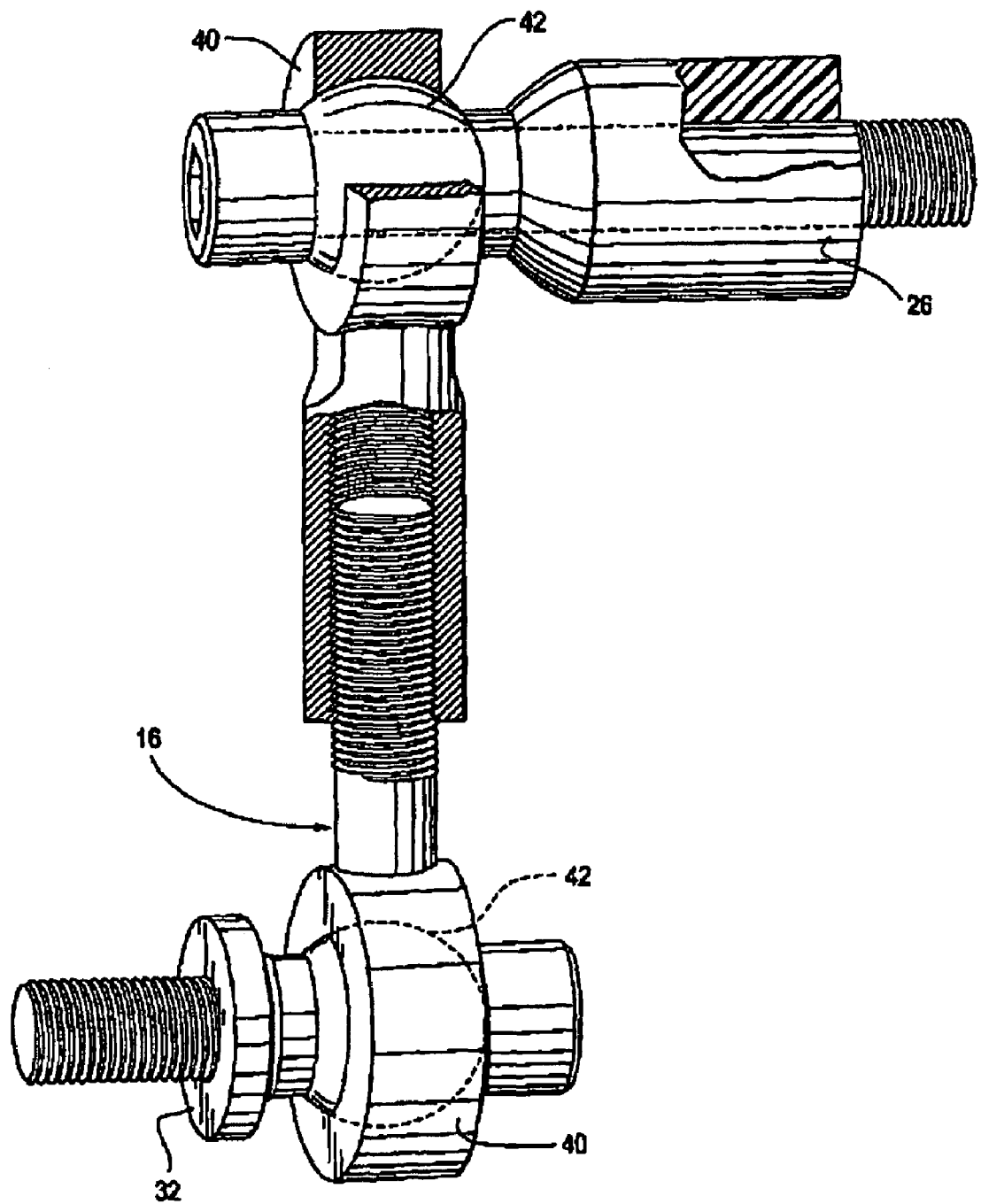
FIG. 7 is an enlarged perspective view, in partial cross-section, illustrating one preferred link mechanism useful in the practice of the present invention.

With reference to the drawings, a vehicle seat suspension apparatus is illustrated in one preferred form and designated generally as 10. The suspension apparatus 10 includes, as basic components, a base 12, an isolator 14 and a plurality of links 16 which are used to suspend the isolator from the base.

The base 12 may take many forms well known to those skilled in the art. In the illustrated embodiment the base has a lower platform 20 and an upper platform 22 mounted to permit vertical movement of the two platforms relative to one another. The mechanism that provides this vertical movement functionality is shown to be a conventional scissors linkage 24, although many other designs may be employed. As the following description will make clear, the base may comprise any suitable structure that will accommodate the links 16 and support the isolator suspended from it. To that end, the upper platform includes a plurality of fixtures 26 that support the connector to which the links 16 are assembled.

The isolator 14 comprises an upper plate 28, to which the seat is mounted in any conventional manner, and a pair of flanges 30 depending from opposing sides of plate 28. Fixtures 32 are located adjacent the bottom edges of the flanges and serve to support the connector to which the links 16 are assembled. The upper plate 28 and flanges 30 are dimensioned so that the base platform 22 may be positioned under the plate and between the flanges, as shown. The flanges 30 also have apertures or cutouts 34 located at the point where the links are connected to the flanges. These apertures 34 allow movement of the isolator relative to the base without interference between the flanges and the links. Those of skill in the art will appreciate that the amount of isolator movement or travel that can be achieved is a function of the height of the flanges, and therefore the length of the links, together with the amount of separation between the edges of the upper platform 22 and the downwardly extending flanges 30. Longer links and greater separation will allow greater isolator travel.

The links 16 are each made up of an intermediate segment which terminates at each end in a connector 40. As illustrated, the connectors 40 have a socket configuration designed to cooperate with the ball connectors 42 mounted to the fixtures 26 and 32. Together, the connectors 40 and 42 comprise a connection that permits the links to move through 360 degrees around the links' vertical orientation. Thus, the isolator 14 is able to move in any horizontal direction relative to base 12.

One preferred embodiment of the invention also makes use of an isolator travel limit system comprising first and second stop members associated with the base and isolator. As illustrated, a stop post 46 extends from the upper platform 22 and through stop aperture 48 located in the isolator upper plate 28. The stop post may be fitted with a conical bumper 50, preferably made of a suitable elastomer. The aperture 48 may also include and elastomeric bumper 52. As a result, the travel of isolator 14 is limited by the engagement of the two stop members. Those of skill in the art will appreciate that the positions of the post 46 and aperture 48 may be reversed so that the post extends down from the isolator and through the aperture located on the base.

In accordance with another preferred embodiment of the invention, a lock out system may also be employed. Again, with reference to the illustrated embodiment one or more lock pins 56 extend upwardly from the upper platform 22 and through appropriately situated lock apertures 58 in the isolator. One or more latch plates 60 are mounted to a lock out actuation lever 62 which permits movement of the latch plates to engage or disengage the lock pins 56. When engages the isolator 14 is locked in fixed position relative to the base 12.

There are important advantages associated with the present invention. One is that because of the gravitationally controlled, self centering characteristics of this suspended isolator design, there is no need for centering springs as are commonly used with most prior art isolator systems. Another advantage has to do with the specific path of travel of the isolator. As the isolator moves off its center position it not only travels horizontally, but also along an upwardly curving path. This creates an increasing resistance to further movement, or the equivalent of an "increasing spring rate" resistance, which is a desirable attribute in seat isolation systems. Still another advantage of the present invention is that there is very little resistance to movement of the isolator at or near its center point. This allows the system to be more effective in attenuating high frequency and low magnitude inputs as compared to conventional isolators using spring and shock absorber arrangements. Finally, the isolator system of the present invention has a much lower profile than conventional isolator systems.

Figure 8:
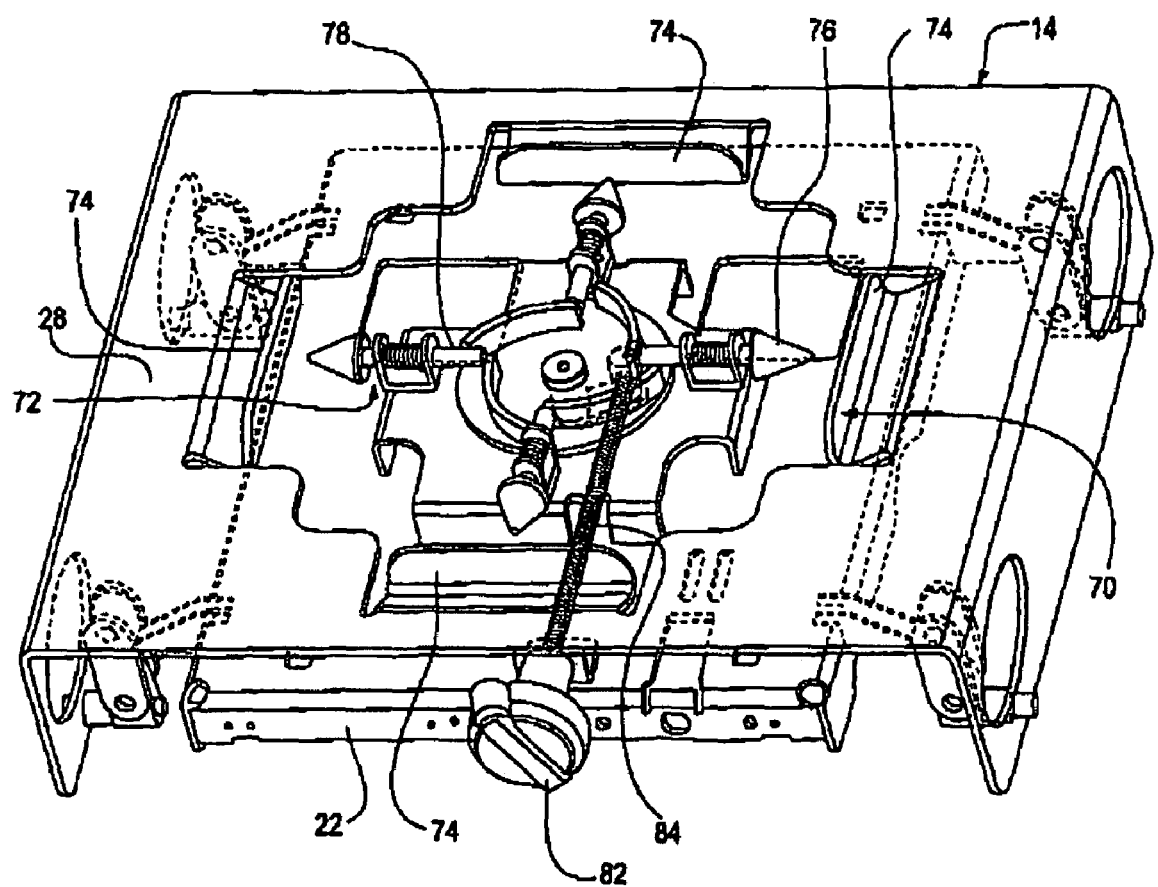
FIG. 8 is a perspective view of another preferred embodiment of the inventions showing an alternative travel limit system.
Figure 9:
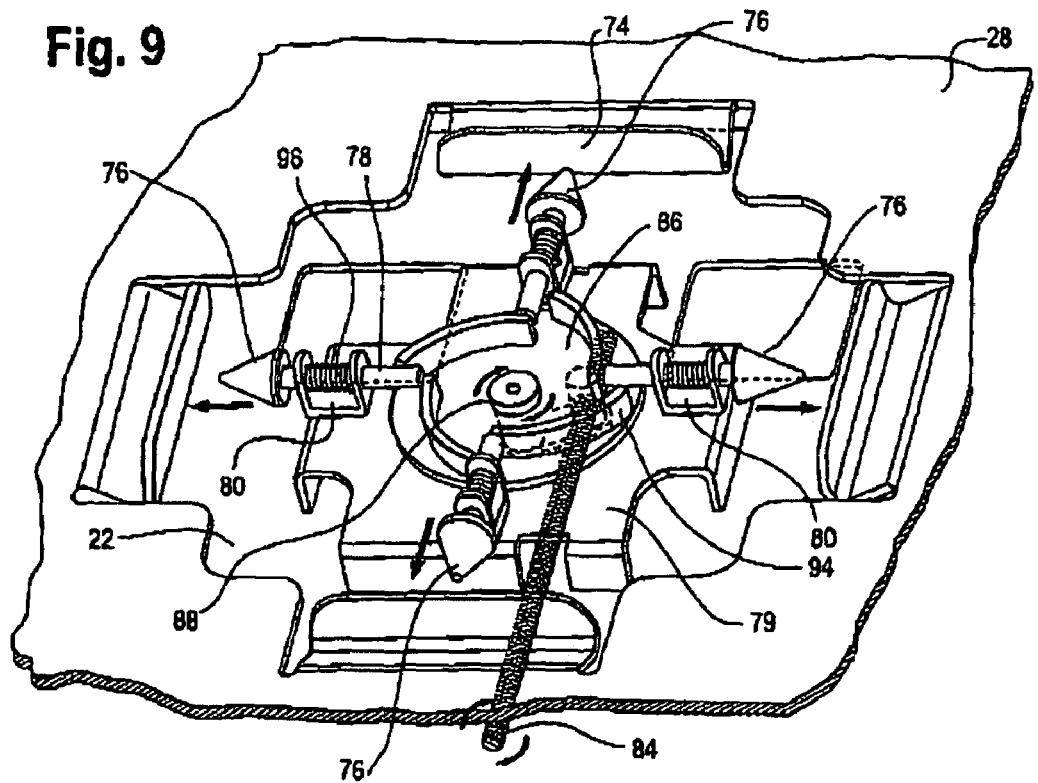
FIGS. 9 and 10 are still further perspective views of the embodiment shown in FIG. 8 with the travel limit system retracted for maximum isolator travel or extended for minimum isolator travel.
Figure 10:
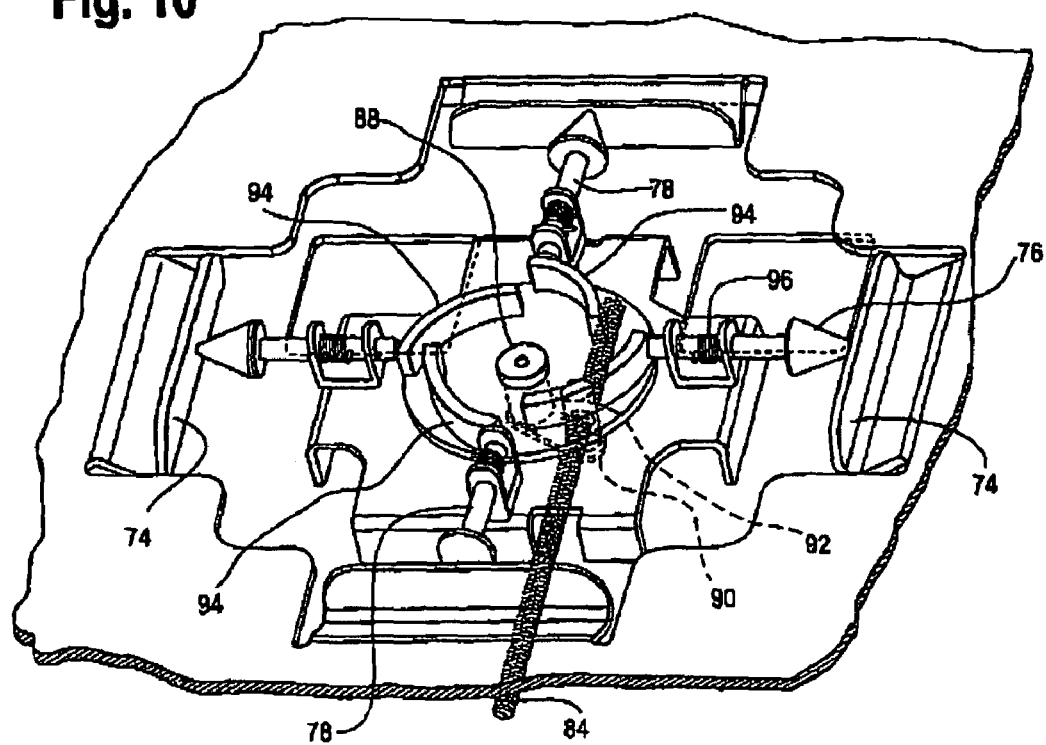

Another preferred embodiment of the invention is illustrated in FIGS. 8-10, showing an alternative travel limit system comprising first and second stop members 70 and 72, respectively. In this embodiment, the first stop member 70 comprises flanges 74 positioned on the perimeter of an opening in the upper plate 28 of isolator 14. The second stop member 72 comprises bumpers 76 mounted to the outer ends of bumper stems 78. The stems 78, in turn, are mounted to upper platform 22 (or riser 79 situated on platform 22) by u-shaped brackets 80, thereby allowing the bumpers 76 to move radially relative to the center point of the platform 22. In this embodiment, the travel limit system employs an adjustment mechanism including a bumper adjustment knob 82, a threaded adjustment shaft 84, and a cam wheel 86. A linkage, including a cam wheel center pivot 88, a cam lever 90 and threaded drive pin 92, is used to connect the threaded shaft 84 to the cam wheel 86. Cam wheel 86 also includes a series of cam surfaces 94, each of which engages the inside end of one of the bumper stems 78. A spring 96, or other biasing means, is used to urge each of the stems 78 inwardly to engage its associated cam surface 94.

To adjust the travel limit of the isolator in accordance with this embodiment, the operator simply turns knob 82, thereby rotating shaft 84. This results in linear motion of drive pin 92 and rotation of lever 90, so that cam wheel pivot 88 and the cam wheel 86 will also rotate either clockwise or counterclockwise. A clockwise rotation of the cam wheel 86 results in positioning of the respective cam surfaces 94 at their outer extent, thereby radially extending the bumper stems and bumpers. This reduces or eliminates any travel in isolator 14. Rotation of the cam wheel in the counterclockwise direction will result in retraction of the cam surface 94, so that the bumpers 76 also will be retracted. This allows maximum travel of the isolator 14. As with earlier embodiments, each of the first and second stop members may be associated with either of the isolator and the upper platform.

It will be appreciated by those skilled in the art that various changes and modifications can be made to the illustrated embodiments without departing from the spirit of the present invention. All such modifications and changes are intended to be covered by the appended claims.

I claim:

1. A vehicle seat suspension apparatus comprising:
    a base
    an isolator positioned above the base;
    a plurality of links suspending the isolator from the base, the links being connected to the base and isolator in a manner permitting the isolator to move horizontally in all directions relative to the base; and
    a travel limit system operatively connected to both the base and the isolator including a plurality of stops and a plurality of elastomeric bumpers, each stop being associated with one of said bumpers, and an adjustment mechanism permitting variation of the amount of horizontal travel of the isolator relative to the base.

2. The vehicle seat suspension apparatus of claim 1 wherein the adjustment mechanism includes a linkage that varies the spacing between the bumpers and the stops.

3. The vehicle suspension apparatus of claim 2 further including a cam wheel having a plurality of cam surfaces; the cam surfaces acting on the bumpers to locate the bumpers relative to the stops.

4. The vehicle seat suspension apparatus of claim 1 wherein the travel limit system stops comprise a plurality of flanges disposed about the perimeter of an aperture in one of the isolator or base and the bumpers are supported on stems operatively connected to the other of the isolator and base and positioned within the aperture; the travel limit system further including a plurality of springs, each associated with one of the bumper stems, biasing the bumpers away from the stops.

5. The vehicle seat suspension apparatus of claim 4 wherein the travel limit system further includes a cam wheel having a plurality of curved cam surfaces, each cam surface acting upon one of the bumper stems in positioning the bumper relative to its associated stop.

* * * * *